(12) United States Patent
Yamada (10) Patent No.: US 7,644,938 B2
(45) Date of Patent: Jan. 12, 2010

(54) IN-WHEEL SUSPENSION

(75) Inventor: Masahiko Yamada, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 362 days.

(21) Appl. No.: 11/722,888

(22) PCT Filed: Aug. 7, 2006

(86) PCT No.: PCT/IB2006/002150

§ 371 (c)(1),
(2), (4) Date: Jun. 27, 2007

(87) PCT Pub. No.: WO2007/020498

PCT Pub. Date: Feb. 22, 2007

(65) Prior Publication Data

US 2008/0100021 A1    May 1, 2008

(30) Foreign Application Priority Data

Aug. 18, 2005   (JP)   ............................. 2005-237723

(51) Int. Cl.
| | |
|---|---|
| B60G 7/02 | (2006.01) |
| B60G 7/00 | (2006.01) |
| B60G 3/01 | (2006.01) |
| B60G 9/00 | (2006.01) |
| B60G 3/20 | (2006.01) |
| B62D 7/18 | (2006.01) |

(52) U.S. Cl. .......................... 280/86.758; 280/124.126; 280/124.127; 280/124.135; 280/124.15; 280/93.512

(58) Field of Classification Search .......... 280/124.126, 280/124, 127, 124.1, 124.11, 124.125, 124.135, 280/124.15, 86.75, 86.758, 153, 93.512, 280/93.51, 93.511; 180/65.5
See application file for complete search history.

(56) References Cited

U.S. PATENT DOCUMENTS

| 873,907 | A | * | 12/1907 | Snediker | ............... | 280/124.127 |
|---|---|---|---|---|---|---|
| 889,489 | A | * | 6/1908 | Snediker | ............... | 280/124.125 |
| 1,041,097 | A | * | 10/1912 | Kennedy | ............. | 280/124.126 |
| 1,058,600 | A | * | 4/1913 | Klitz | ................... | 280/124.127 |
| 1,143,410 | A | * | 6/1915 | Lagergren | ............ | 280/124.126 |

(Continued)

FOREIGN PATENT DOCUMENTS

DE    295 19 108    4/1997

(Continued)

*Primary Examiner*—Paul N Dickson
*Assistant Examiner*—Jordan Golomb
(74) *Attorney, Agent, or Firm*—Oblon, Spivak, McClelland, Maier & Neustadt, L.L.P.

(57) ABSTRACT

An in-wheel suspension including a tire/wheel assembly-side member that includes a tire/wheel assembly support member fixed to a tire/wheel assembly, a vehicle body-side member that supports the tire/wheel assembly support member such that the tire/wheel assembly support member can slide along a sliding axis X extending in the substantially vertical direction and rotate on the sliding axis X, and at least one of a spring element and an attenuation element that acts in accordance with sliding of the tire/wheel assembly support member. The in-wheel suspension further includes a coupling member that couples the tire/wheel assembly-side member with the vehicle body-side member, and that rotates the tire/wheel assembly support member in accordance with the sliding of the tire/wheel assembly support member.

21 Claims, 10 Drawing Sheets

U.S. PATENT DOCUMENTS

| | | | | |
|---|---|---|---|---|
| 1,173,048 A * | 2/1916 | Simmons et al. | ...... | 280/124.127 |
| 1,356,984 A | 10/1920 | Howell | | |
| 1,770,938 A * | 7/1930 | Martin | ................ | 280/124.127 |
| 1,819,579 A * | 8/1931 | Whitcomb et al. | .... | 280/124.127 |
| 2,039,041 A * | 4/1936 | Wall | ........................... | 267/254 |
| 2,071,686 A * | 2/1937 | Frederickson | ........ | 280/124.126 |
| 2,081,045 A * | 5/1937 | Soper | .................. | 280/124.126 |
| 2,135,152 A * | 11/1938 | Simmonds | ........... | 280/124.127 |
| 2,148,606 A | 2/1939 | Chamberlain | | |
| 2,155,521 A * | 4/1939 | Zavarella | ............. | 280/124.127 |
| 2,216,907 A * | 10/1940 | Clemons | ................ | 280/86.757 |
| 2,241,217 A * | 5/1941 | Peeters | ................ | 280/124.127 |
| 2,523,598 A * | 9/1950 | Smith | ........................ | 188/369 |
| 2,580,383 A * | 12/1951 | Frank | .................. | 280/124.134 |
| 3,380,754 A * | 4/1968 | Rauls | .................. | 280/124.134 |
| 3,492,018 A * | 1/1970 | Lutze et al. | ........... | 280/124.126 |
| 3,578,354 A * | 5/1971 | Schott | ................. | 280/124.126 |
| 4,542,920 A * | 9/1985 | Kijima et al. | ............. | 280/5.524 |
| 5,405,162 A * | 4/1995 | Chun | .................. | 280/124.143 |
| 5,499,839 A * | 3/1996 | Wahl et al. | ............ | 280/124.145 |
| 6,113,119 A * | 9/2000 | Laurent et al. | ........... | 280/124.1 |
| 6,116,627 A * | 9/2000 | Kawabe et al. | ......... | 280/124.15 |
| 6,170,838 B1 * | 1/2001 | Laurent et al. | ........... | 280/5.508 |
| 6,257,604 B1 * | 7/2001 | Laurent et al. | ........ | 280/124.127 |
| 6,357,770 B1 * | 3/2002 | Carpiaux et al. | ...... | 280/124.127 |
| 6,406,036 B1 * | 6/2002 | Laurent et al. | ........... | 280/5.509 |
| 7,168,719 B2 * | 1/2007 | Gerrard | ............... | 280/124.135 |
| 7,243,934 B2 * | 7/2007 | Lee et al. | ............... | 280/124.128 |
| 7,287,611 B2 * | 10/2007 | Nagaya | .................... | 180/65.51 |
| 7,398,982 B2 * | 7/2008 | Hozumi | ................... | 280/93.512 |
| 7,401,794 B2 * | 7/2008 | Laurent et al. | ........... | 280/5.514 |
| 7,427,072 B2 * | 9/2008 | Brown | ........................ | 280/5.5 |
| 7,434,823 B2 * | 10/2008 | Robinson | ............. | 280/124.153 |
| 7,537,071 B2 * | 5/2009 | Kamiya | .................... | 180/65.51 |
| 7,543,825 B2 * | 6/2009 | Yamada | ..................... | 280/5.52 |
| 2003/0107201 A1 * | 6/2003 | Chun | .................. | 280/124.135 |
| 2003/0209869 A1 * | 11/2003 | Kwon | ....................... | 280/86.75 |
| 2005/0146111 A1 * | 7/2005 | Yamazaki et al. | ...... | 280/124.135 |
| 2005/0200092 A1 * | 9/2005 | Orimoto et al. | ........ | 280/93.512 |
| 2005/0200094 A1 * | 9/2005 | Hozumi | ................. | 280/124.135 |
| 2005/0275183 A1 * | 12/2005 | Amano | ................. | 280/124.128 |
| 2006/0012144 A1 * | 1/2006 | Kunzler et al. | ........ | 280/124.125 |
| 2008/0185807 A1 * | 8/2008 | Takenaka | ............. | 280/124.153 |
| 2008/0203693 A1 * | 8/2008 | Yamada | ............... | 280/124.127 |

FOREIGN PATENT DOCUMENTS

| | | | |
|---|---|---|---|
| EP | 1 526 011 A1 | | 4/2005 |
| JP | 62-77207 | | 4/1987 |
| JP | 10-109510 | | 4/1998 |
| JP | 10338009 | | 12/1998 |
| JP | 11-334337 | | 12/1999 |
| JP | 2000-233619 | | 8/2000 |
| JP | 2002-120532 | | 4/2002 |
| JP | 2005-22436 | | 1/2005 |
| JP | 2007062498 A | * | 3/2007 |
| JP | 2007118766 A | * | 5/2007 |
| JP | 2007161195 A | * | 6/2007 |
| WO | WO2007042870 | * | 4/2007 |

* cited by examiner

FRONT OF VEHICLE

FIG. 11B

INSIDE OF VEHICLE

IN-WHEEL SUSPENSION

FIELD OF THE INVENTION

The invention relates to an in-wheel suspension where main portions of suspension components are arranged in a wheel.

BACKGROUND OF THE INVENTION

Such an in-wheel suspension is described, for example, in Japanese Patent Application Publication No. JP-A-10-338009. The in-wheel suspension described in this publication includes a hub that supports a wheel. The wheel mainly includes a disc and a rim. The rim has a reference width and a reference diameter. The in-wheel suspension includes a wheel carrier that defines the rotational axis of the hub, and a guide member that guides the movement of the wheel carrier with respect to a support member in the axial direction. The support member includes fitting means for fitting the support member to a chassis of a vehicle. The wheel carrier is fitted to the guide member by a long-and-thin single bar, and slides according to the guidance by the guide member. The wheel carrier is prevented from rotating on the sliding axis. The wheel carrier is fitted to the both ends of the bar. The in-wheel suspension includes means for supporting a load of the vehicle transmitted to the wheel carrier by the support member. The wheel carrier, the bar, and the guide member are housed in the wheel along the diameter defined by the reference diameter. The wheel carrier, the bar, and the guide member are housed in a limited space having a shape of a cylinder where one of the surfaces of the cylinder, which extend in the axial direction of the wheel carrier, bar, and the guide member, is defined by the disc of the wheel and the other surface is defined by a virtual surface contacting the rim.

To ensure the stability of the vehicle, changing a toe-angle of a tire/wheel assembly when the tire/wheel assembly jounces/rebounds is effective. In the above-described structure, a steering mechanism is provided, and the tire/wheel assembly can be steered. However, the tire/wheel assembly can actually move only along the sliding shaft when the tire/wheel assembly jounces/rebounds. Unless the steering operation is performed using the steering mechanism (namely, unless a driver operates a steering wheel, or unless an actuator is actuated in the case where active rear steer (ARS) is employed), the toe-angle of the tire/wheel assembly does not change when the tire/wheel assembly jounces/rebounds.

Even in such a structure, a support member can be fitted the vehicle body by a link such that the toe-angle of the tire/wheel assembly changes when the tire/wheel assembly jounces/rebounds. In such a case, however, a relatively long link needs to be provided in order to obtain required characteristics of a change in the toe-angle. This prevents size reduction of a suspension and an increase in a space in a vehicle compartment, resulting in reduction of the advantages of an in-wheel suspension.

DISCLOSURE OF THE INVENTION

It is an object of the invention to provide an in-wheel suspension that can change a toe-angle of a tire/wheel assembly when the tire/wheel assembly jounces/rebounds without reducing the advantages of the in-wheel suspension.

A first aspect of the invention relates to an in-wheel suspension provided with a tire/wheel assembly-side member that includes a tire/wheel assembly support member fixed to a tire/wheel assembly, a vehicle body-side member that supports the tire/wheel assembly support member such that the tire/wheel assembly support member can slide along a rotational axis extending in the vertical/substantially vertical direction and rotate on the rotational axis, and at least one of a spring element and an attenuation element that acts in accordance with sliding of the tire/wheel assembly support member. The in-wheel suspension further includes a coupling member that couples the tire/wheel assembly-side member with the vehicle body-side member, and that rotates the tire/wheel assembly support member in accordance with the sliding of the tire/wheel assembly support member.

A second aspect of the invention relates to an in-wheel suspension provided with a tire/wheel assembly-side member that includes a tire/wheel assembly support member fixed to a tire/wheel assembly, a rotation support member that supports the tire/wheel assembly support member such that the tire/wheel assembly support member can rotate on the rotational axis extending in the vertical/substantially vertical direction, a vehicle body-side member that supports the rotation support member such that the rotation support member can slide along the sliding axis extending in the vertical/substantially vertical direction but cannot rotate on the sliding axis, and at least one of a spring element and an attenuation element that acts in accordance with sliding of the rotation support member. The in-wheel suspension further includes a coupling member that couples the tire/wheel assembly support member with the vehicle body-side member, and that rotates the tire/wheel assembly support member on the rotational axis in accordance with the sliding of the rotation support member.

The coupling member may include a first arm that is pivotably supported by the vehicle body-side member; a second arm that is pivotably supported by the tire/wheel assembly-side member; and a coupling portion that couples the first arm with the second arm such that the first arm and the second arm can rotate with respect to each other. Also, the pivot axis of the first arm and the pivot axis of the second arm may be non-parallel with each other.

The pivot axis of the first arm may be set so as to be perpendicular to the rotational axis, and the pivot axis of the second arm may be set so as to tilt with respect to the pivot axis of the first arm such that the distance between the pivot axis of the first arm and the pivot axis of the second arm increases upward and toward the front of the vehicle.

The pivot axis of the first arm may be set so as to be perpendicular to the rotational axis, and the pivot axis of the second arm may be set so as to tilt with respect to the pivot axis of the first arm such that the distance between the pivot axis of the first arm and the pivot axis of the second arm increases upward and toward the inside of the vehicle.

A toe-angle adjustment mechanism may be provided to the coupling member. In this case, the toe-angle adjustment mechanism may be driven by an actuator.

The toe-angle adjustment mechanism may include a ball joint and an eccentric cam, and the ball joint and the eccentric cam may be arranged such that the central axis of the ball joint and the rotational axis of the eccentric cam are non-coaxial.

The spring element and the attenuation element may be coaxially arranged, and the axis of the spring element and the attenuation element, and the rotational axis of the tire/wheel assembly support member may be non-parallel and noncoplanar.

The axis of the spring element and the attenuation element may be set to tilt with respect to the rotational axis of the tire/wheel assembly support member such that the distance between the axis of the spring element and the attenuation element, and the rotational axis of the tire/wheel assembly support member increases upward and toward the rear of the vehicle, and the axis of the spring element and the attenuation element is set so as to be outboard of the rotational axis of the tire/wheel assembly support member.

A third aspect of the invention relates to an in-wheel suspension provided with a rotation support mechanism that supports a tire/wheel assembly via a rotation member such that the tire/wheel assembly can rotate in the direction in which a steering wheel is operated, a sliding support mechanism that supports the tire/wheel assembly via a sliding member such that the tire/wheel assembly can slide in the substantially vertical direction with respect to a vehicle body, and at least one of a spring element and an attenuation element that acts in accordance with sliding of the sliding member. The in-wheel suspension further includes a coupling member that couples the rotation support mechanism with the sliding support mechanism, that restricts rotation of the rotation member, and that rotates the rotation member in accordance with the sliding of the sliding member.

The invention provides the in-wheel suspension that can change the toe-angle of the tire/wheel assembly when the tire/wheel assembly jounces/rebounds.

BRIEF DESCRIPTION OF THE DRAWINGS

The foregoing and further objects, features and advantages of the invention will become apparent from the following description of example embodiments with reference to the accompanying drawings, wherein the same or corresponding portions will be denoted by the same reference numerals and wherein.

DETAILED DESCRIPTION OF THE EXAMPLE EMBODIMENTS

Hereafter, example embodiments of the invention will be described in detail with reference to accompanying drawings.

Figure 1:
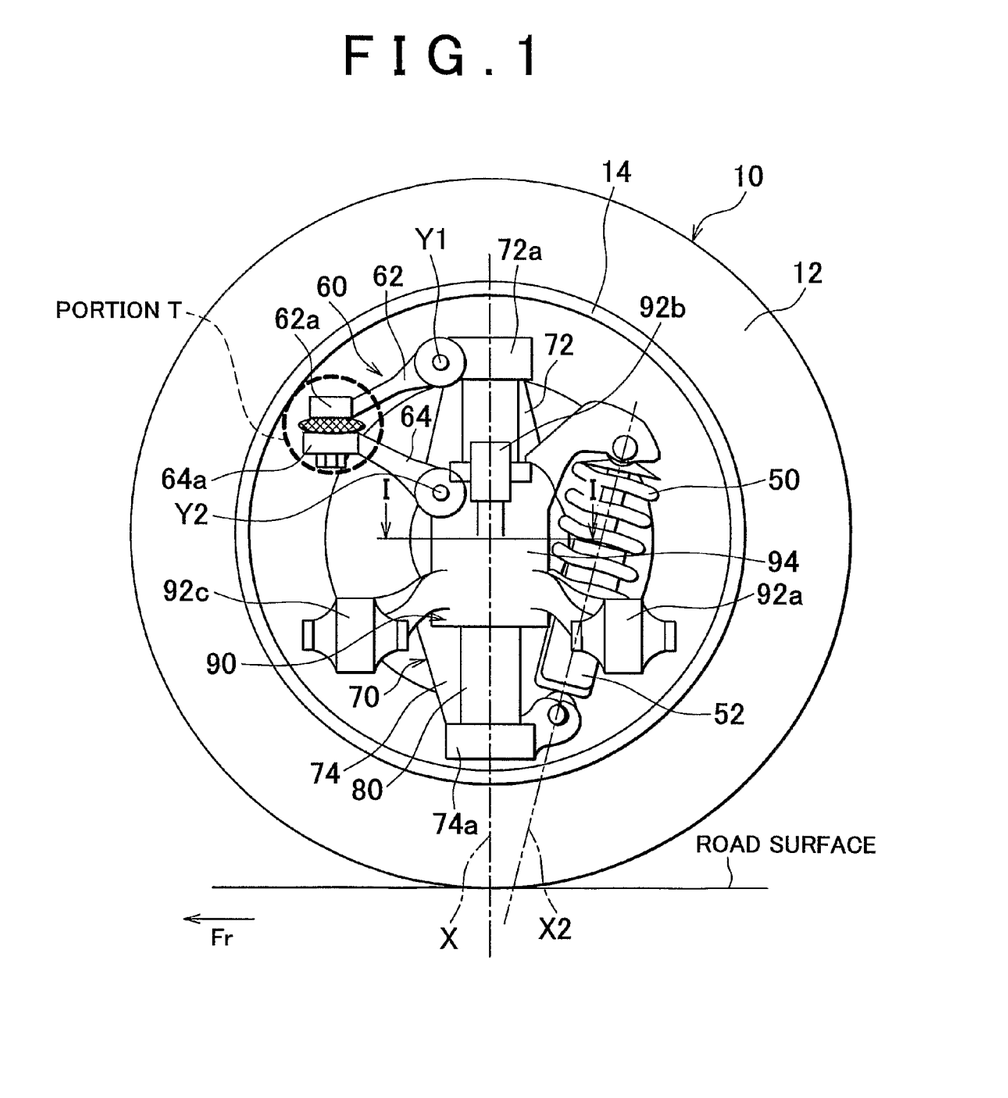
FIG. 1 illustrates the side view showing the structure of a main portion of an in-wheel suspension according to a first embodiment of the invention.

FIG. 1 illustrates the structure of the main portion of an in-wheel suspension according to a first embodiment of the invention. FIG. 1 is the side view of a tire/wheel assembly viewed from the inside of a vehicle. The left side of FIG. 1 is the front of the vehicle. In the description below, the in-wheel suspension according to the first embodiment is applied to a rear wheel. However, the in-wheel suspension according to the first embodiment may be applied to a front wheel.

A tire/wheel assembly 10 includes a tire 12 and a wheel 14. As described below in detail, main portions of suspension components are arranged in a space defined by the inner peripheral surface of the rim of the wheel 14. The term "in the wheel" corresponds to the term "in the substantially cylindrical space defined by the inner peripheral surface of the rim of the wheel 14". However, the description that a component is arranged in the wheel does not always mean that the entirety of the component is arranged in the wheel. The description includes the structure where the component partially protrudes from the wheel.

A carrier 70 is arranged in the wheel. The carrier 70 has an axle bearing (not shown) near the wheel center, and rotatably supports the tire/wheel assembly 10. A brake rotor is provided inboard of the carrier 70, and a brake caliper (not shown) is fixed to the carrier 70.

The carrier 70 has two arm portions 72, 74. The arm portion 72 extends upward from the wheel center, and the arm portion 74 extends downward from the wheel center. An end portion 72a of the arm portion 72 and an end portion 74a of the arm portion 74 are arranged inboard of the center portion of the carrier 70. A shaft member 80, which extends in the substantially vertical direction (in the vertical direction, in the first embodiment), is provided between the end portions 72a, 74a. In the first embodiment, the shaft member 80 is fixed to the end portions 72a, 74a. The shaft member 80 and the carrier 70 constitute a "tire/wheel assembly-side member".

A vehicle body-side member 90 extends from a vehicle body into the wheel, and supports the tire/wheel assembly 10 such that the tire/wheel assembly 10 can move in the vertical/substantially vertical direction. The vehicle body-side member 90 is provided with coupling portions 92a, 92b, 92c that are fixed to the vehicle body (for example, a suspension member) via respective bushings. The coupling portions 92a, 92b, 92c are arranged on the vehicle body side. The bushings at the respective coupling portions may be formed such that various shocks from road surfaces can be appropriately attenuated. In addition, the vehicle body-side member 90 includes a support portion 94 in the wheel. The support portion 94 slidably and rotatably supports the shaft member 80 of the tire/wheel assembly-side member.

Figure 2:
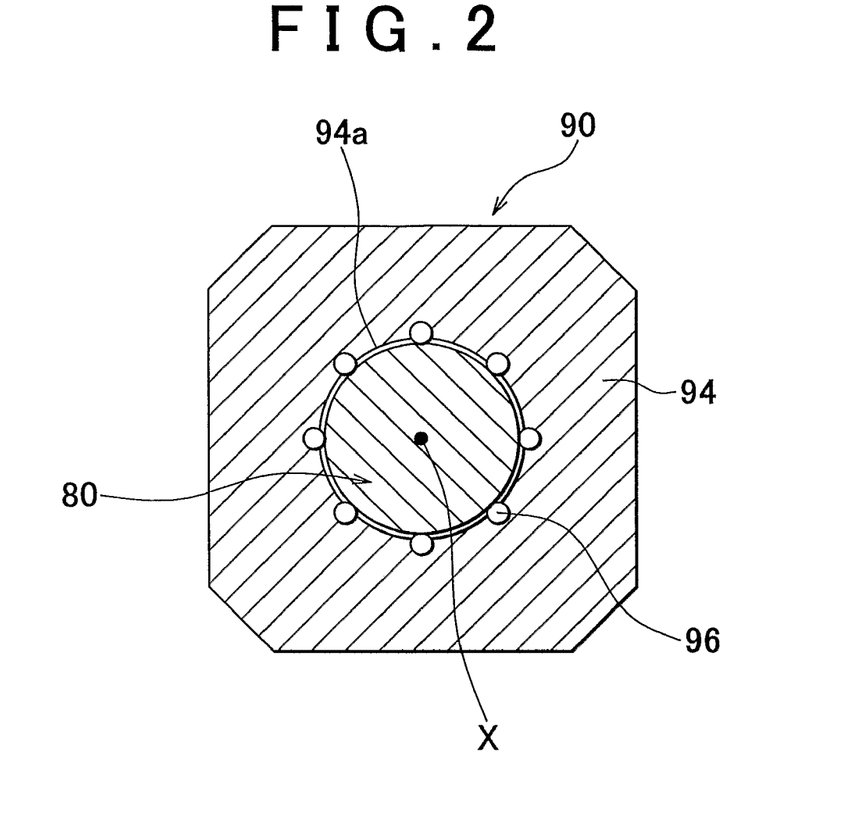
FIG. 2 illustrates the cross-sectional view taken along line I-I in FIG. 1.

FIG. 2 illustrates the cross-sectional view taken along line I-I in FIG. 1. In the example shown in FIG. 2, the shaft member 80 has a circular cross section that is constant in the axial direction. A sliding groove 94a having a circular cross section is formed in the support portion 94. The shaft member 80 is supported by the support portion 94 such that the shaft member 80 can slide along a central axis X and rotate on the central axis X in the sliding groove 94a formed in the support portion 94. For example, bearings 96 may be arranged in the sliding groove 94a of the support portion 94 in order to reduce friction that is generated during sliding and rotation of the shaft member 80.

With the structural relationship between the shaft member 80 and the vehicle body-side member 90 described above, the tire/wheel assembly-side member can slide in the vertical/substantially vertical direction along the central axis X of the shaft member 80 and rotate on the central axis X. Namely, certain degrees of freedom in the vertical/substantially vertical movement and the rotational movement of the tire/wheel assembly 10 with respect to the vehicle body are ensured.

Figure 3:
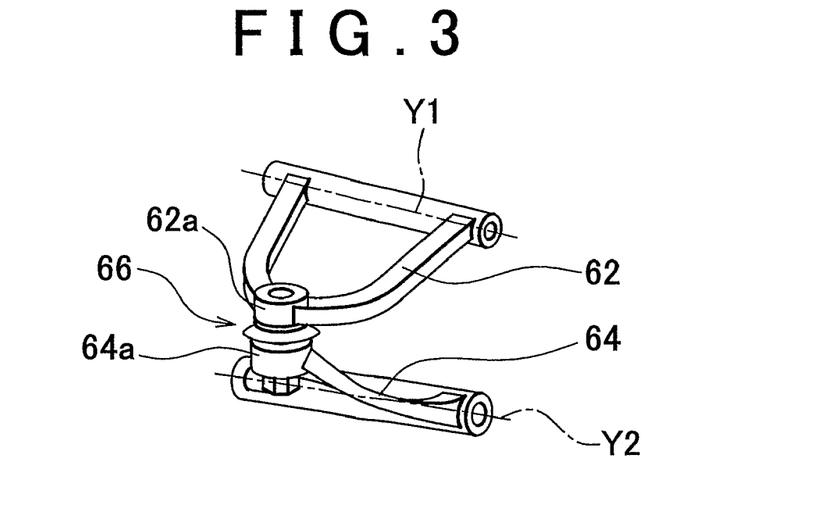
FIG. 3 illustrates the perspective view showing a coupling member 60.

The carrier 70 and the vehicle body-side member 90 are coupled with each other by a coupling member 60. The vertical/substantially vertical movement of the tire/wheel assembly-side member (the shaft member 80 and the carrier 70) along the central axis X is permitted, while its rotation on the central axis X is restricted. More specifically, the coupling member 60 includes two arms 62, 64, as shown in FIG. 3. Each of the arms 62, 64 may be an A-shaped arm, as shown in FIG. 3. The arm 62 is coupled with the carrier 70 so as to be pivotable about a pivot axis Y1 that extends in the vehicle-width direction. The arm 64 is coupled with the vehicle body-side member 90 so as to be pivotable about a pivot axis Y2 that extends in the vehicle-width direction. The arms 62, 64 may be pivotably supported at the pivot axes Y1, Y2, respectively, using, for example, ball joints, rubber bushings, or bearings. An end portion 62a of the arm 62 and an end portion 64a of the arm 64 are coupled with each other at a coupling portion 66 so as to be rotatable with respect to each other. In FIG. 3, the end portions 62a, 64a may be coupled with each other by a ball joint. However, the end portions 62a, 64a may be coupled with each other, for example, by a rubber bushing or a bearing.

Thus, the vertical/substantially vertical movement of the tire/wheel assembly-side member (the shaft member 80 and the carrier 70) along the central axis X is permitted, while its rotation on the central axis X is restricted. Namely, a certain degree of freedom in the vertical/substantially vertical movement of the tire/wheel assembly 10 with respect to the vehicle body is ensured.

A spring (coil spring) 50 and an absorber 52 are arranged between the vehicle body-side member 90 and the carrier 70 (or the shaft member 80). More specifically, in the wheel, the upper end of the spring 50/absorber 52 (the upper end of a rod) is fitted to the vehicle body-side member 90, and the lower end of the spring 50/absorber 52 (the lower end of a shell) is fitted to the carrier 70. Thus, the load point of the spring 50/absorber 52 is positioned in the wheel. In the embodiment shown in FIG. 1, the spring 50 is arranged between a lower spring seat and an upper spring seat so as to surround the absorber 52. The spring 50 and the absorber 52 coaxially extend and contract in the vertical/substantially vertical direction. However, the spring 50 and the absorber 52 need not extend and contract coaxially with each other. Also, any one of a spring coil, a leaf spring and an air spring may be used as the spring 50. The absorber 52 may be either a hydraulic absorber that attenuates a shock input in the vertical/substantially vertical direction or a rotary electromagnetic absorber that attenuates a shock input in the rotational direction.

If the tire/wheel assembly 10 moves in the vertical/substantially vertical direction (when the tire/wheel assembly 10 jounces/rebounds), the shaft member 80 slides in the vertical/substantially vertical direction along the axis X in the sliding groove 94a of the support portion 94, when relatively viewed from the vehicle body side. The spring 50/absorber 52 extends and contracts in accordance with the sliding of the shaft member 80. As a result, a shock from the road surface is attenuated.

In order to ensure the stability of the vehicle, changing a toe-angle of the tire/wheel assembly 10 when the tire/wheel assembly 10 jounces/rebounds is effective.

Accordingly, in the first embodiment, the pivot axes Y1 and Y2 are arranged such that the extended lines of the pivot axes Y1 and Y2 form a predetermined angle $\theta$ (see FIG. 4) that is greater than zero degree, instead of being arranged in parallel with each other, when viewed from the rear of the vehicle. As described later, the predetermined angle $\theta$ is a parameter that defines the characteristics of changes in the toe-angle of the tire/wheel assembly 10 when the tire/wheel assembly 10 jounces/rebounds. The predetermined angle $\theta$ is set such that the toe-angle is changed by an intended amount. For example, the predetermined angle $\theta$ may be set to a value greater than zero degree and less than five degrees ($0° < \theta < 5°$).

Figure 4:
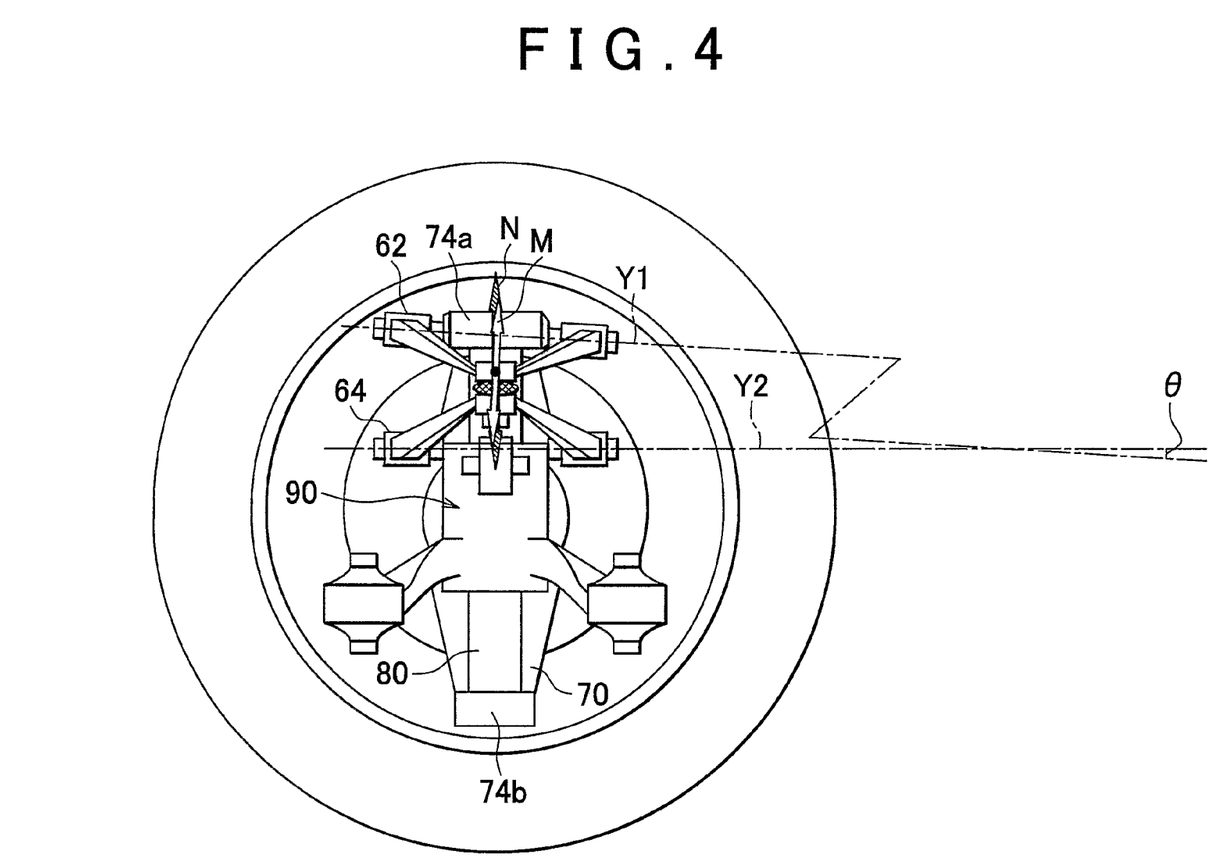
FIG. 4 illustrates the view for describing the principle of a change in a toe-angle when a tire/wheel assembly jounces/rebounds.

FIG. 4 illustrates the view for describing the principle of a change in the toe-angle, which is caused in response to the operation of the coupling member 60 (the arms 62, 64) when the tire/wheel assembly 10 jounces/rebounds. To facilitate the understanding of the principle of the change in the toe-angle, FIG. 4 shows the structure different from that shown in FIG. 1. Namely, in FIG. 4, the pivot axes Y1, Y2 of the coupling member 60 (the arms 62, 64) extend in the longitudinal direction of the vehicle, not in the vehicle-width direction shown in FIG. 1 (namely, FIG. 4 shows the structure that is realized by turning the coupling member 60 shown in FIG. 1 by 90 degrees on the axis X). In FIG. 4, the spring 50 and the absorber 52 are not shown. The first embodiment can be realized regardless of the angular positions of the pivot axes Y1, Y2 with respect to the axis X.

As shown in FIG. 4, when the tire/wheel assembly 10 jounces/rebounds, the end portion 62a of the arm 62 attempts to pivot about the pivot axis Y1 in the direction of an arrow M. Similarly, the end portion 64a of the arm 64 attempts to pivot about the pivot axis Y2 in the direction shown by an arrow N. As described above, because the pivot axis Y1 and the pivot axis Y2 are not parallel with each other, the direction M in which the end portion 62a of the arm 62 attempts to pivot and the direction N in which the end portion 64a of the arm 64 attempts to pivot deviate from each other. Also, the end portions 62a, 64a are coupled with each other. Accordingly, a torque corresponding to the deviation is generated around the axis X. Then, the shaft member 80 (the tire/wheel assembly 10) rotates on the central axis X (namely, the shaft member 80 rotates on the axis X in the sliding groove 94a of the support portion 94). Thus, the toe-angle of the tire/wheel assembly 10 can be changed when the tire/wheel assembly 10 jounces/rebounds. According to the first embodiment described so far, the stability of the vehicle can be enhanced by appropriately changing the toe-angle based on a degree of extension/contraction of the spring 50/absorber 52. Especially, in the example shown in FIG. 4, the pivot axis Y2 extends perpendicularly to the central axis X when viewed from the side of the vehicle, and the pivot axis Y1 tilts with respect to the pivot axis Y2 such that the distance between the pivot axis Y1 and the pivot axis Y2 increases upward and toward the front of the vehicle. Accordingly, when the tire/wheel assembly 10 jounces, the orientation of the tire/wheel assembly 10 changes such that the toe-in-angle increases, and an understeer operation can be performed. Similarly, in the example shown in FIG. 1, the pivot axis Y2 is set so as to be perpendicular to the central axis X and the pivot axis Y1 is set so as to tilt with respect to the pivot axis Y2 such that the distance between the pivot axis Y1 the pivot axis Y2 increases upward and toward the inside of the vehicle, when viewed from the rear of the vehicle. Thus, the understeer operation can be performed when the tire/wheel assembly 10 jounces.

In the first embodiment, the carrier 70 and the vehicle body-side member 90 are coupled with each other by the coupling member 60. However, the shaft member 80 and the vehicle body-side member 90 may be coupled with each other by the coupling member 60.

In the first embodiment, the shaft member 80 may be regarded as a "sliding member" and a "rotational member" in the invention.

Figure 5:
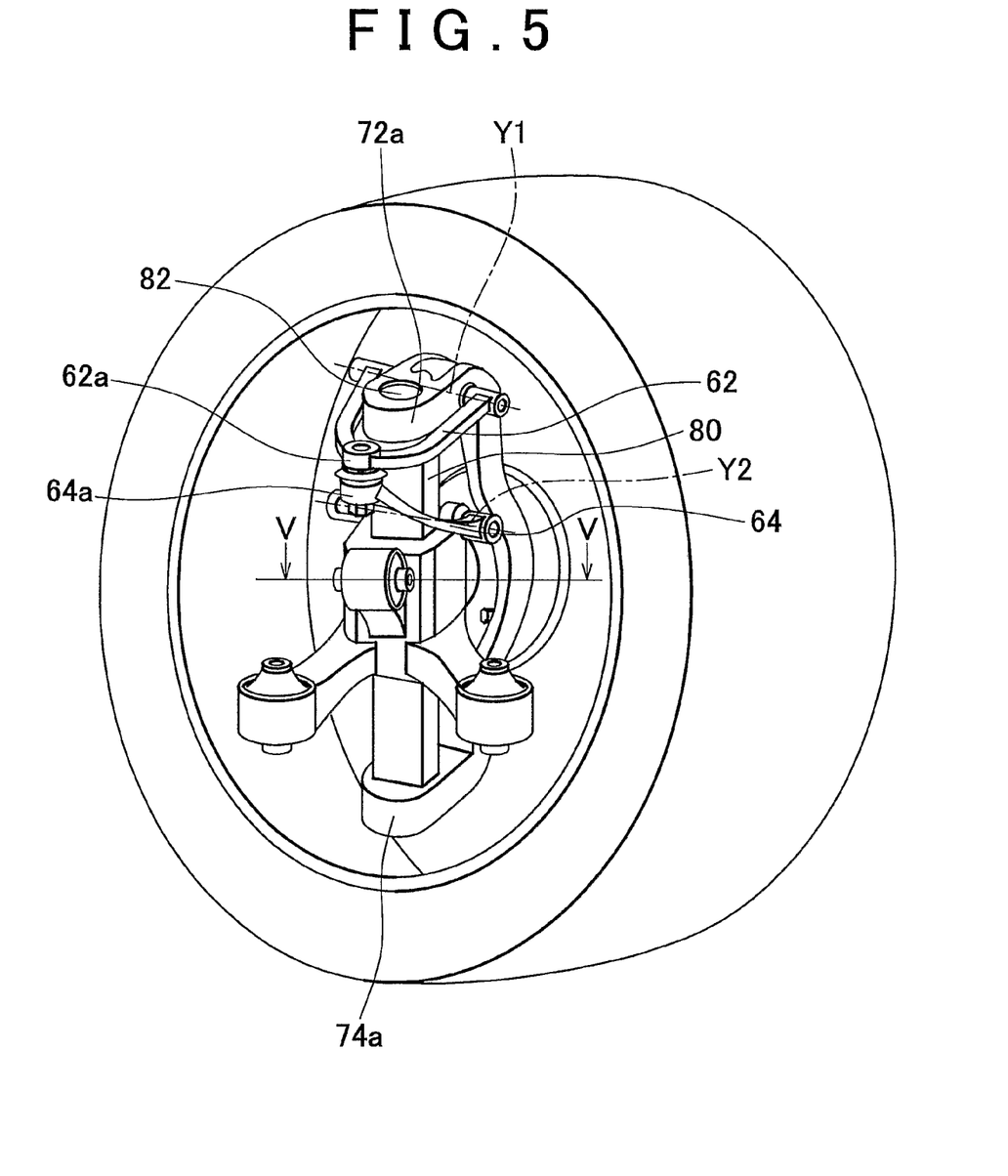
FIG. 5 illustrates the perspective view showing the structure of a main portion of an in-wheel suspension according to a second embodiment of the invention.

FIG. 5 illustrates the structure of a main portion of an in-wheel suspension according to a second embodiment of the invention. FIG. 5 illustrates the perspective view of the tire/wheel assembly 10 viewed from the inside of the vehicle. The left side of FIG. 5 is the front of the vehicle. In the description below, the in-wheel suspension according to the second embodiment is applied to a rear wheel. However, the in-wheel suspension according to the second embodiment may be applied to a front wheel. The same portions as those in the first embodiment will be denoted by the same reference numerals, and only the structure specific to the second embodiment will be described below.

In the second embodiment, the shaft member 80 rotatably supports the carrier 70. The rotational axis of the carrier 70 may be the central axis X of the shaft member 80, which extends in the substantially vertical direction (in the vertical direction, in the second embodiment). More specifically, the end portion 72a of the arm portion 72 of the carrier 70 and the end portion 74a of the arm portion 74 of the carrier 70 are supported by an upper end 82 and a lower end 82 of the shaft member 80, respectively, (only the upper end 82 is shown in FIG. 5) such that the end portions 72a, 74a can rotate on the central axis X. The end portions 72a, 74a may be supported by the upper end 82 and lower end 82 using, for example, ball joints, rubber bushings, or bearings, respectively. Accordingly, in the second embodiment, the shaft member 80 constitutes a "rotation support member", and the carrier 70 constitutes the "tire/wheel assembly-side member".

Figure 6:
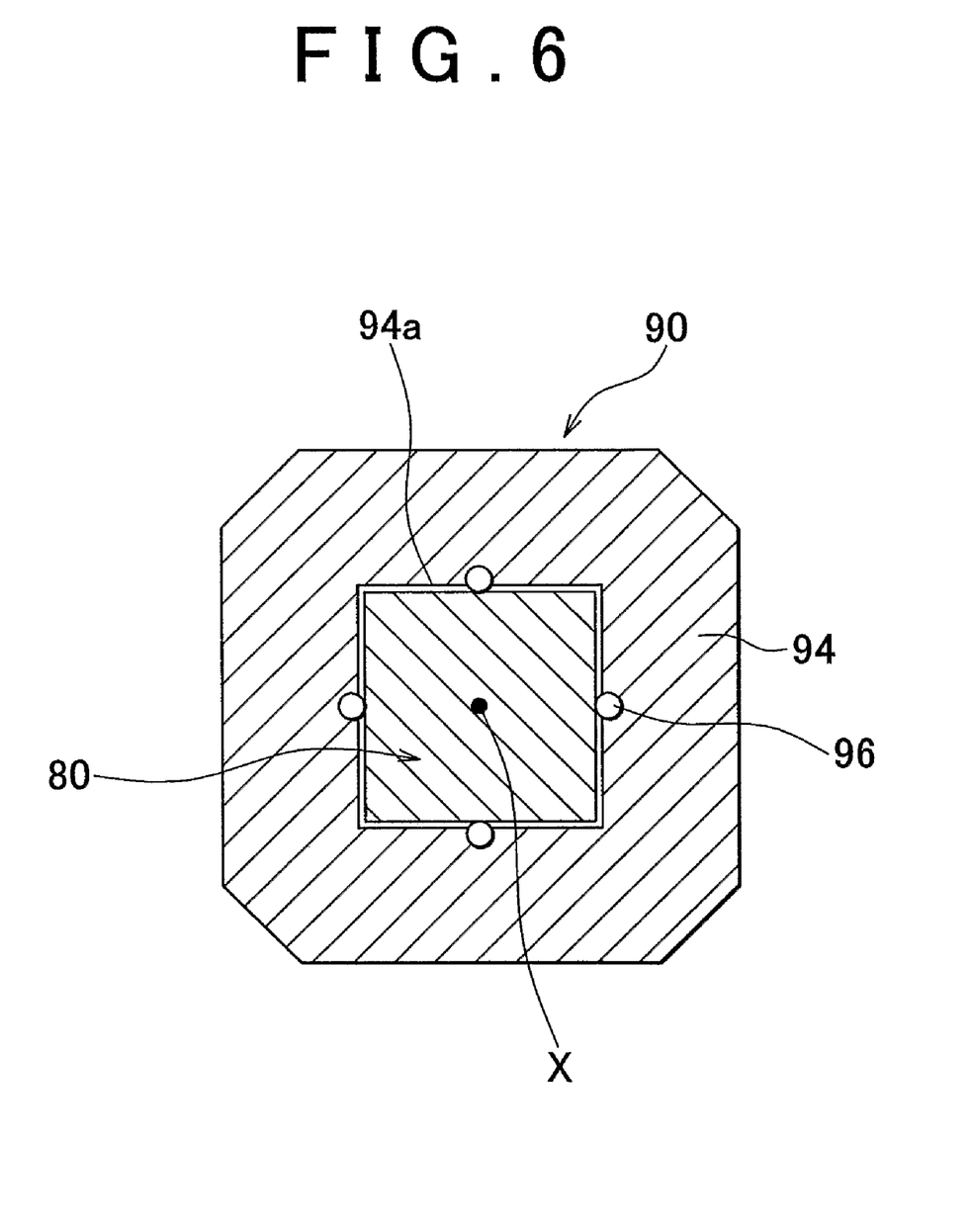
FIG. 6 illustrates the cross-sectional view taken along line V-V in FIG. 5.

As shown in FIG. 6, the vehicle body-side member 90 extends from the vehicle body into the wheel, and supports the tire/wheel assembly 10 such that the tire/wheel assembly 10 can move in the vertical/substantially vertical direction. The vehicle body-side member 90 is provided with the coupling portions 92a, 92b, 92c that are fixed to the vehicle body (for example, the suspension member) via respective bushings. The coupling portions 92a, 92b, 92c are provided on the vehicle body side. The bushings at the respective coupling portions may be formed so as to be appropriately deformed in response to various shocks from road surfaces. In addition, the vehicle body-side member 90 includes the support portion 94 in the wheel. The support portion 94 supports the shaft member 80 such that the shaft member 80 can slide along the central axis X but cannot rotate on the central axis X.

FIG. 6 illustrates the cross-sectional view taken along line I-I in FIG. 5. In the example shown in FIG. 6, the shaft member 80 has a rectangular cross section (the cross section may have any shapes other than a circle) that is constant in the axial direction. The shaft member 80 is supported in the sliding groove 94a, which has a rectangular cross section, formed in the support portion 94 such that the shaft member 80 can slide along the central axis X but cannot rotate on the central axis X. Alternatively, the shaft member 80 may be splined to the support portion 94 such that the shaft member 80 can slide along the central axis X but cannot rotate on the central axis X. For example, the bearings 96 may be arranged in the sliding groove 94a of the support portion 94 to reduce friction that is generated during sliding of the shaft member 80.

With the structural relationship between the carrier 70 of the tire/wheel assembly-side member and the shaft member 80 and the structural relationship between the shaft member 80 and the vehicle body-side member 90, the carrier 70 can rotate on the central axis X of the shaft member 80 and slide in the vertical/substantially vertical direction along the central axis X. Namely, certain degrees of freedom in the vertical/substantially vertical movement and the rotational movement of the tire/wheel assembly 10 with respect to the vehicle body are ensured.

Similarly, the carrier 70 and the vehicle body-side member 90 are coupled with each other by the coupling member 60. The vertical/substantially vertical movement of the carrier 70 along the central axis X of the shaft member 80 is permitted, while its rotation on the central axis X of the shaft member 80 is restricted. In the second embodiment, as shown in FIG. 5, the pivot axes Y1, Y2 of the coupling member 60 (the arms 62, 64) extend in the longitudinal direction of the vehicle, as in the structure shown in FIG. 4. However, the pivot axes Y1, Y2 may extend in any directions, when viewed from the top of the vehicle. Thus, a certain degree of freedom in the vertical/substantially vertical movement of the tire/wheel assembly 10 with respect to the vehicle body is ensured.

In the second embodiment, the pivot axis Y1 of the arm 62 and the pivot axis Y2 of the arm 64 are arranged such that the extended lines of the pivot axes Y1 and Y2 form a predetermined angle θ that is greater than zero degree, instead of being arranged in parallel with each other, when viewed from the side of the vehicle. As described later, the predetermined angle θ is a parameter for defining an amount of change in the toe-angle of the tire/wheel assembly 10 when the tire/wheel assembly 10 jounces/rebounds. The predetermined angle θ is set such that the toe-angle changes by an intended amount. For example, the predetermined angle θ may be set to a value greater than zero degree and less than five degrees ($0°<θ<5°$).

Similarly, the spring 50 (not shown) and the absorber 52 (not shown) are arranged between the vehicle body-side member 90 and the carrier 70 (or the shaft member 80). Thus, if the tire/wheel assembly 10 jounces/rebounds, the shaft member 80 slides in the vertical/substantially vertical direction along the axis X in the sliding groove 94a of the support portion 94, when relatively viewed from the vehicle body side. The spring 50/absorber 52 extends and contracts in accordance with the sliding of the shaft member portion 80. As a result, a shock from the road surface is attenuated.

In the second embodiment as well, the pivot axis Y1 of the arm 62 and the pivot axis Y2 of the arm 64 are not parallel with each other, when viewed from the side of the vehicle. Accordingly, it is possible to change the toe-angle of the tire/wheel assembly 10 when the tire/wheel assembly 10 jounces/rebounds. As described so far, according to the second embodiment, the stability of the vehicle can be enhanced by appropriately changing the toe-angle based on a degree of extension/contraction of the spring 50/absorber 52.

Figure 7A:
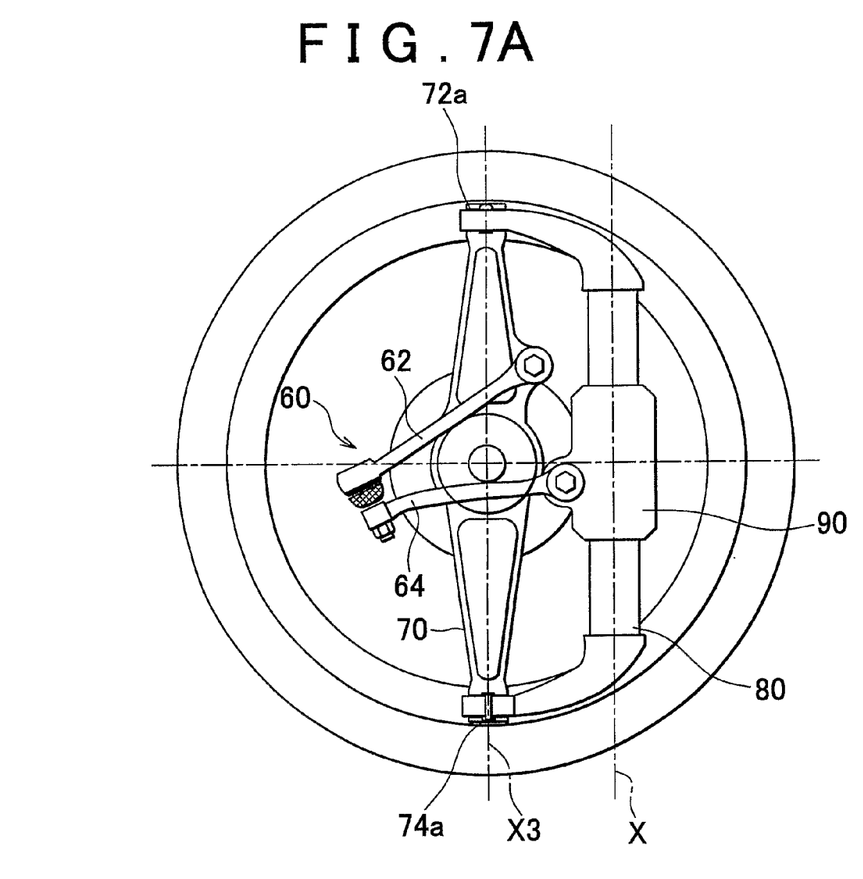
FIG. 7A illustrates the cross-sectional view showing the structure of a main portion of an in-wheel suspension according to a modified example of the second embodiment, when viewed from the side of a vehicle.
Figure 7B:
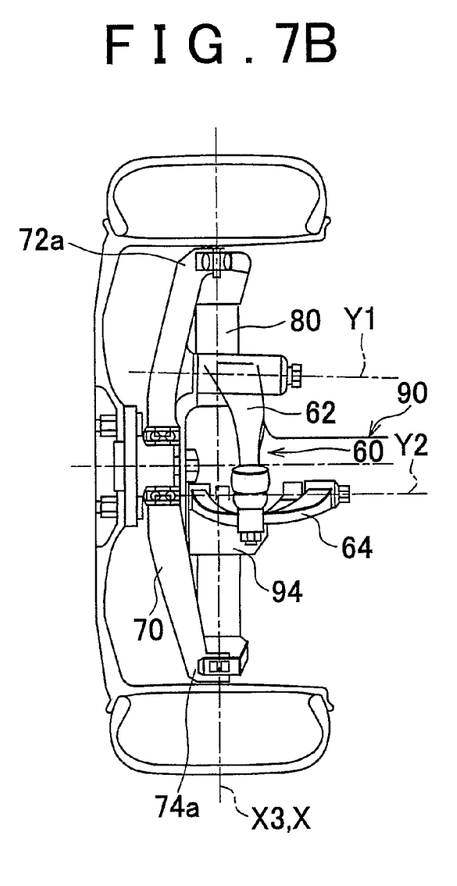
FIG. 7B illustrates the side view showing the structure of the main portion of the in-wheel suspension according to the modified example of the second embodiment, when viewed from the rear of a vehicle.

In the second embodiment, the central axis X of the shaft member 80, which extends in the vertical/substantially vertical direction, is used as the rotational axis of the carrier 70. However, the rotational axis of the carrier 70 (namely, the axis corresponding to a king pin axis) need not coincide with the central axis X of the shaft member 80 (namely, the axis along which the shaft member 80 slides). As shown in FIGS. 7A and 7B, a rotational axis X3 of the carrier 70 and the central axis X of the shaft member 80 may be individually formed in parallel with each other. FIG. 7B illustrates the cross-sectional view of the structure of the main portion, when viewed from the rear of the vehicle. In the example shown in FIG. 7B, the rotational axis X3 of the carrier 70 coincides with the central axis X of the shaft member 80. However, the rotational axis X3 of the carrier 70 and the central axis X of the shaft member 80 need not coincide with each other. Also, the rotational axis X3 of the carrier 70 and the central axis X of the shaft member 80 need not be parallel with each other.

In the second embodiment, the shaft member 80 may be regarded as the "sliding member" in the invention, and the carrier 70 may be regarded as the "rotational member" in the invention.

A third embodiment of the invention is realized according to the first embodiment or the second embodiment of the invention. According to the third embodiment, a toe-angle adjustment mechanism is provided to the in-wheel suspension according to the first embodiment or the second embodiment.

Figure 8:
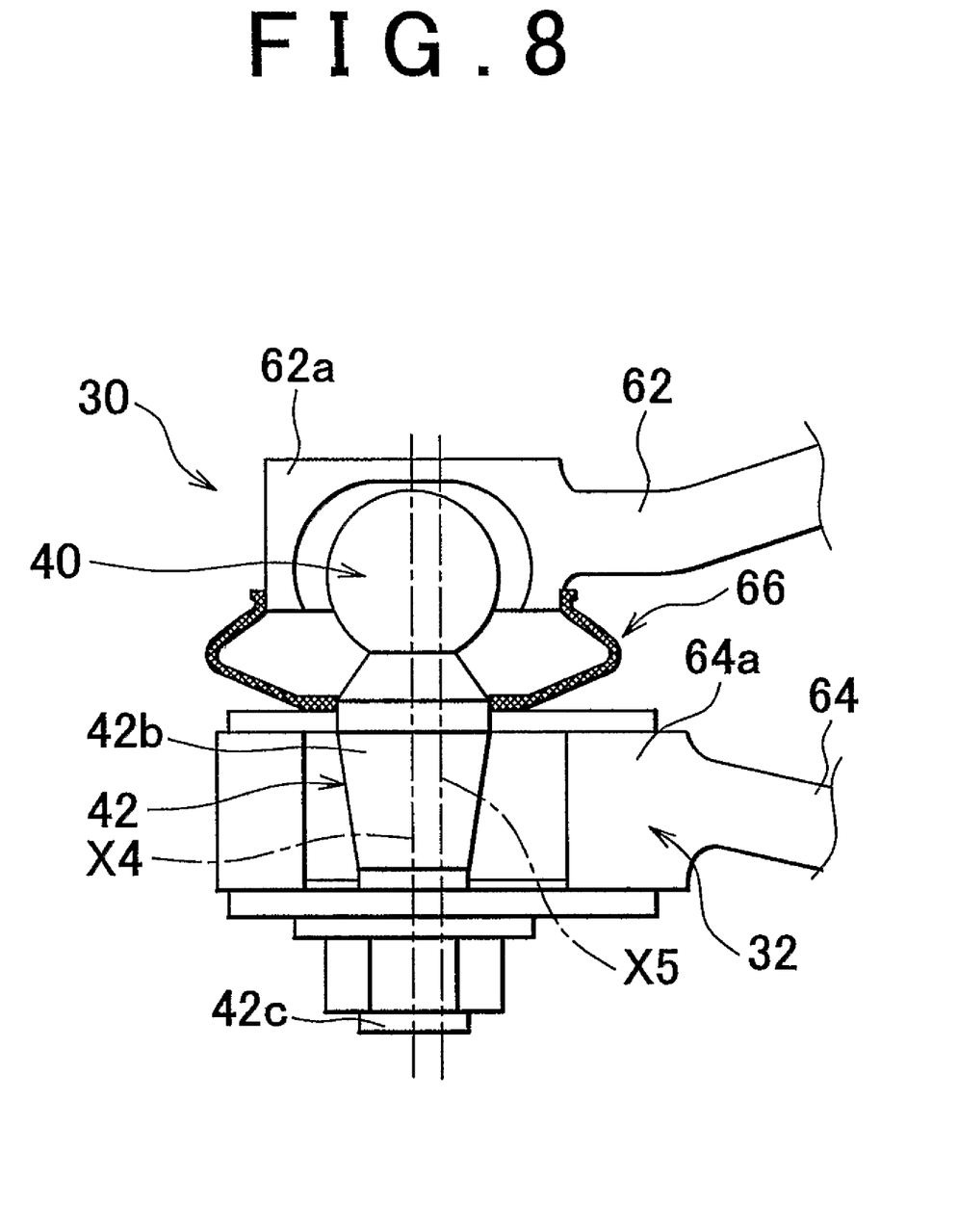
FIG. 8 illustrates the enlarged cross-sectional view of a toe-angle adjustment mechanism 30 according to a third embodiment of the invention.

In the third embodiment, a toe-angle adjustment mechanism 30 is provided to the coupling member 60. FIG. 8 illustrates the enlarged cross-sectional view of a portion T in FIG. 1, and shows the toe-angle adjustment mechanism 30. In the example shown in FIG. 8, a ball joint 40 is used as the coupling portion 66 that couples the end portion 62*a* of the arm 62 with the end portion 64*a* of the arm 64 such that the end portions 62*a*, 64*a* can rotate with respect to each other. The ball joint 40 includes a ball stud 42. A screw shaft portion 42*c* is provided at the end portion of a tapered shaft portion 42*b* of the ball joint 40. The taper shaft portion 42*b* is fitted in a tapered hole formed on the arm 64 side. Then, a nut is tightened to the screw shaft portion 42*c*.

In the third embodiment, the tapered hole of the arm 64 is formed in an eccentric cam 32 that is fitted so as to be rotatable on an axis X5. The rotational axis X5 of the eccentric cam 32 deviates from a central axis X4 of the ball joint 40 (the central axis of the tapered hole). Accordingly, when the eccentric cam 32 is rotated, the positional relationship between the end portion 62*a* of the arm 62 and the end portion 64*a* of the arm 64 changes (the position at which the end portions 62*a*, 64*a* are coupled with each other deviates from the original position). As the positional relationship changes, the shaft member 80 (the tire/wheel assembly 10) rotates on the central axis X. Rotating the eccentric cam 32 makes it possible to adjust the toe-angle to an intended toe-angle.

In the third embodiment, the eccentric cam 32 of the toe-angle adjustment mechanism 30 is provided on the arm 64 side. However, the eccentric cam 32 may be provided on the arm 62 side. In the third embodiment, the toe-angle adjustment mechanism 30 is provided at the end portions 62*a*, 64*a* of the arms 62, 64. However, such a toe-angle adjustment mechanism 30 may be provided at either the pivot axis Y1 of the arm 62 or the pivot axis Y2 of the arm 64 (at the pivotable coupling portion).

A fourth embodiment of the invention relates to another structure of the toe-angle adjustment mechanism 30 according to the third embodiment.

Figure 9:
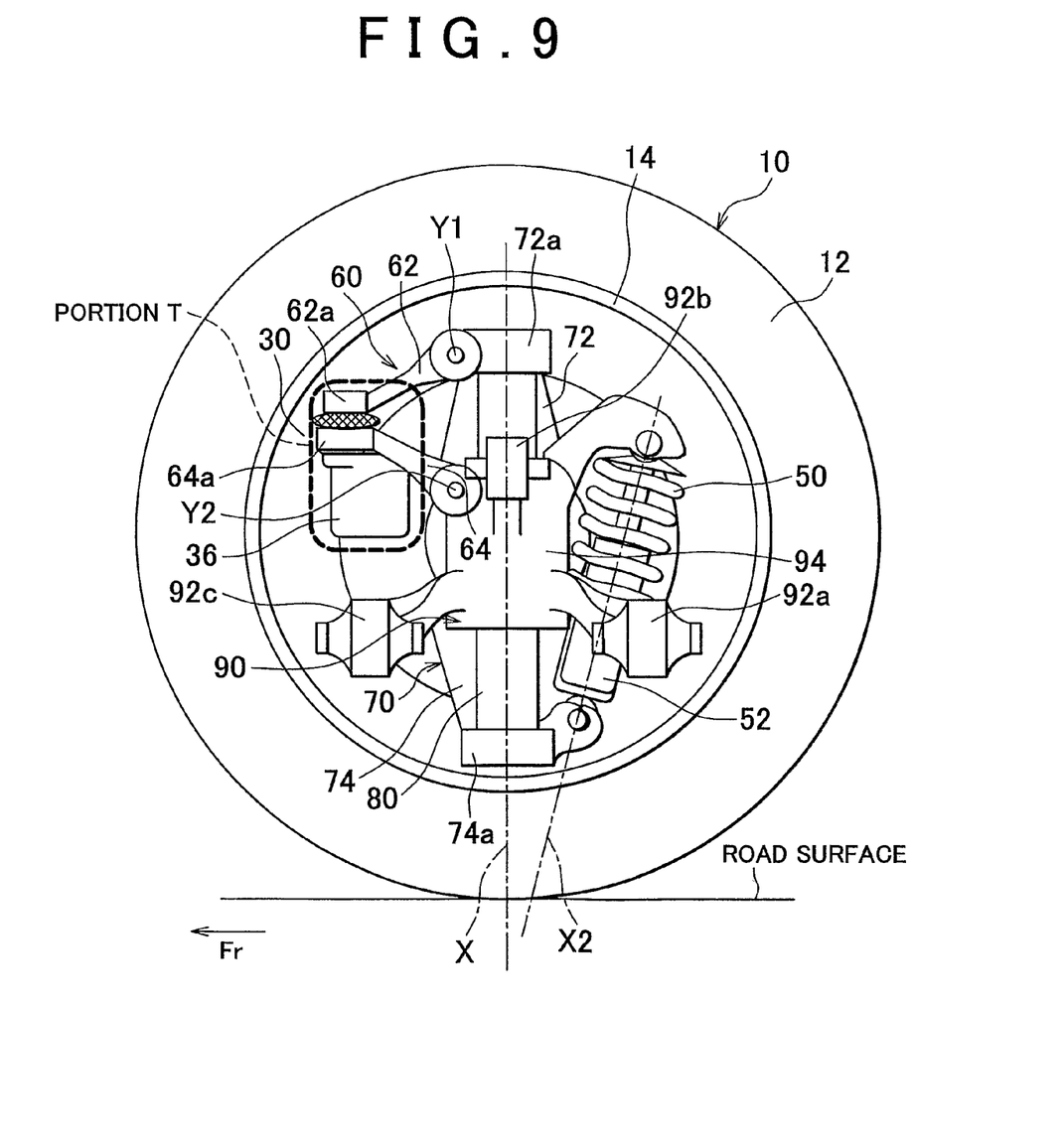
FIG. 9 illustrates the side view showing a main portion of an in-wheel suspension according to a fourth embodiment of the invention.

FIG. 9 illustrates the structure of a main portion of an in-wheel suspension according to the fourth embodiment of the invention. FIG. 9 illustrates the side view of the tire/wheel assembly 10 viewed from the inside of the vehicle. The left side of FIG. 9 is the front of the vehicle. In the description below, the in-wheel suspension according to the fourth embodiment is applied to a rear wheel. However, the in-wheel suspension according to the fourth embodiment may be applied to a front wheel. The fourth embodiment realized according to the first embodiment will be described below. However, the fourth embodiment may be realized according to the second embodiment. The same portions as those in the first or third embodiment will be denoted by the same reference numerals, and only the structure specific to the fourth embodiment will be described.

Figure 10:
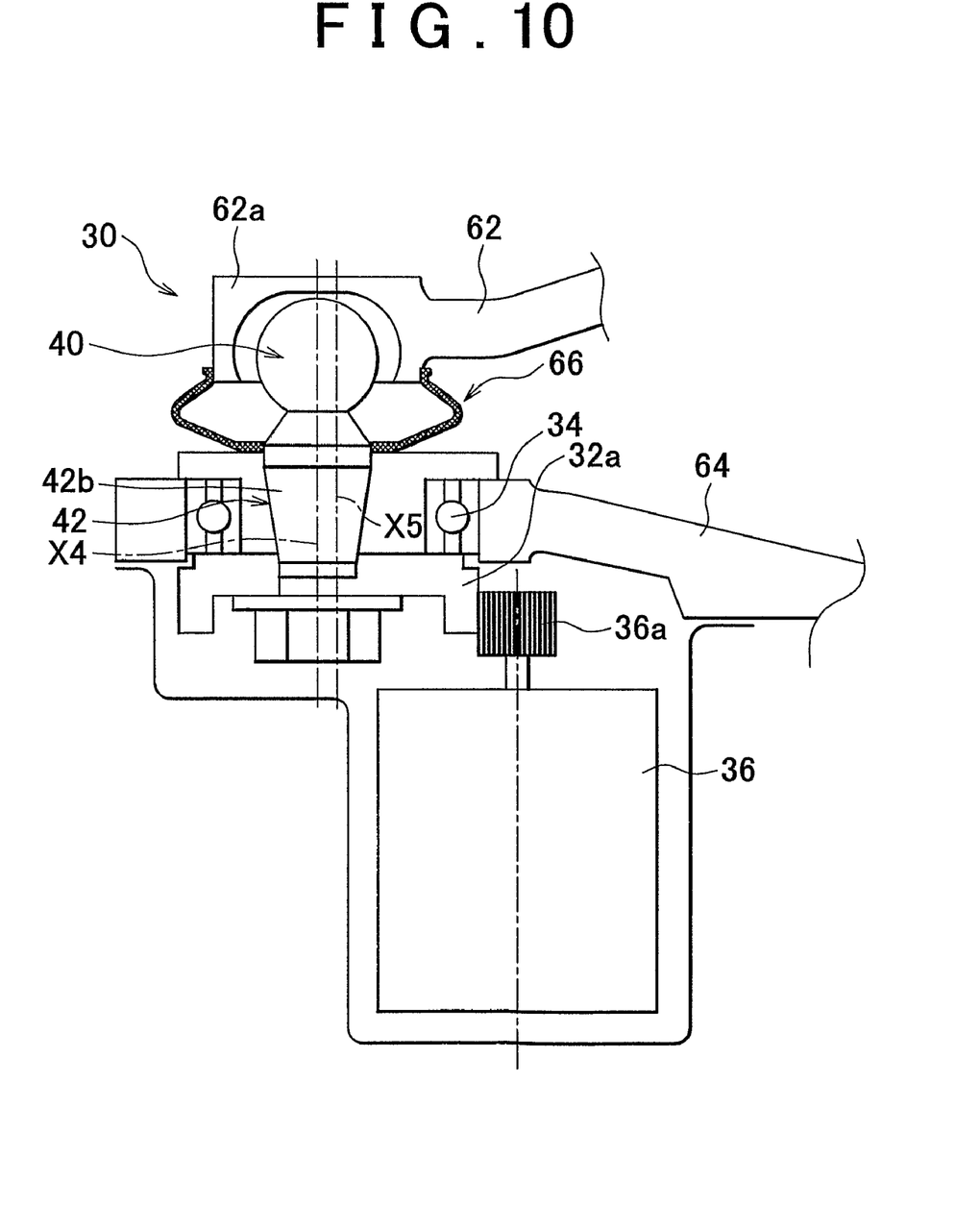
FIG. 10 illustrates the enlarged cross-sectional view of the toe-angle adjustment mechanism 30 according to the fourth embodiment of the invention.

In the fourth embodiment, the toe-angle adjustment mechanism 30 that can be driven by an actuator is provided to the coupling member 60. FIG. 10 illustrates the enlarged cross-sectional view of a portion T in FIG. 9, and shows the toe-angle adjustment mechanism 30.

As shown in FIG. 10, the toe-angle adjustment mechanism 30 includes the eccentric cam 32 provided to the arm 64, as in the third embodiment. However, the toe-angle adjustment mechanism 30 may be provided to the arm 62. Alternatively, the toe-angle adjustment mechanism 30 may be provided at either the pivot axis Y1 of the arm 62 or the pivot axis Y2 of the arm 64 (at the pivotable coupling portion).

In the fourth embodiment, the eccentric cam 32 is rotatably fitted to the arm 64 via a bearing 34. The eccentric cam 32 has a gear 32*a*, and is rotated by an electric motor 36 that has an output shaft 36*a* meshed with the gear 32*a*. Accordingly, in the fourth embodiment as well, when the eccentric cam 32 is rotated by driving the electric motor 36, the positional relationship between the end portion 62*a* of the arm 62 and the end portion 64*a* of the arm 64 changes. As the positional relationship changes, the shaft member 80 (the tire/wheel assembly 10) rotates on the central axis X. Rotating the eccentric cam 32 makes it possible to adjust the toe-angle to an intended toe-angle.

In the fourth embodiment, a rear wheel steering system "ARS" (Active Rear Steer) can be realized by actively controlling the rotation of the eccentric cam 32, namely, the toe-angle of the tire/wheel assembly 10 using the electric motor 36 under control by an ECU (not shown). As described above, according to the fourth embodiment, the arm need not be extended from the vehicle body side in order to steer the carrier 70, when the rear wheel steering system is realized. The rear wheel steering system can be completed within a suspension unit. In a vehicle without the rear wheel steering system, a space for such an arm need not be reserved. Generally, the rear wheel steering system is optionally arranged in a vehicle. According to the fourth embodiment, however, the vehicle without the rear wheel steering system and the vehicle with the rear wheel steering system can be selectively produced just by selecting presence or absence of the electric motor 36 with regard to the hardware structure.

A fifth embodiment is realized according to any one of the first, second, third, and fourth embodiments. An axis X2 of the spring 50/absorber 52 and the rotational axis of the carrier 70 (corresponding to the central axis X of the shaft member 80 in the first and second embodiments) are set to be noncoplanar and non-parallel (i.e., the axis X2 and the rotational axis of the carrier 70 are not parallel with each other and not in the same plane). Thus, the toe-angle of the tire/wheel assembly 10 can be changed when the tire/wheel assembly 10 jounces/rebounds.

Figure 11A:
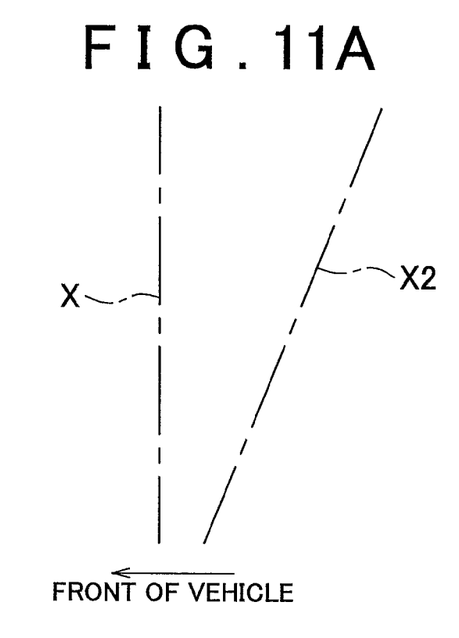
FIGS. 11A and 11B each illustrate the positional relationship between an axis X2 of a spring 50/absorber 52 and a rotational axis X of a carrier 70.
Figure 11B:
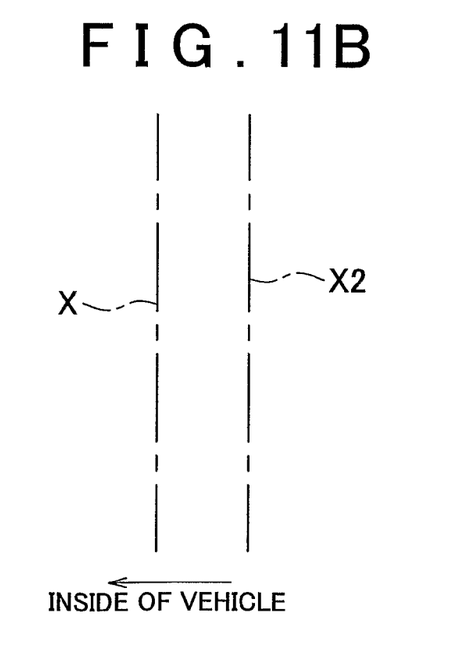

FIGS. 11A and 11B each illustrate the relationship between the axis X2 of the spring 50/absorber 52 and the rotational axis X of the carrier 70. FIG. 11A illustrates the view showing the relationship between the rotational axis X and the axis X2 in the in-wheel suspension in FIG. 1, when viewed from the side of the vehicle. FIG. 11B illustrates the view showing the relationship between the rotational axis X and the axis X2, when viewed from the rear of the vehicle.

In the fifth embodiment, as shown in FIG. 11A, the rotational axis X of the carrier 70 (corresponding to the king pin axis) extends in the vertical direction, and the axis X2 of the spring 50/absorber 52 tilts with respect to the rotational axis X of the carrier 70 such the distance between the rotational axis X and the axis X2 increases upward and toward the rear of the vehicle, when viewed from the side of the vehicle. Also, as shown in FIG. 11B, the lower end of the axis X2 of the spring 50/absorber 52 (the coupling portion on the tire/wheel assembly side) is arranged outboard of the lower end of the rotational axis X, when viewed from the rear of the vehicle. According to the fifth embodiment, the response of the vehicle to the steering operation, and the stability and the directional stability of the vehicle can be improved by setting the positional relationship between the rotational axis X and the axis X2 such that a moment for increasing the toe-in-angle is generated around the rotational axis X of the carrier 70 when the tire/wheel assembly 10 jounces. The positional relationship between the rotational axis X and the axis X2 is not limited to that shown in FIG. 11. Any structure may be employed as long as a moment for increasing the toe-in-angle is generated around the rotational axis X of the carrier 70 when the tire/wheel assembly 10 jounces.

In the fifth embodiment, as described in the second embodiment, the central axis X of the shaft member 80, which extends in the vertical/substantially vertical direction, is used as the rotational axis of the carrier 70. However, the rotational axis of the carrier 70 (namely, the axis corresponding to the king pin axis) and the central axis X of the shaft member 80 need not coincide with each other. The rotational axis of the carrier 70 and the central axis X may be individually formed in parallel with each other.

The example embodiments of the invention that have been described in the specification are to be considered in all respects as illustrative and not restrictive. Various changes which come within the meaning and range of equivalency of the claims are therefore intended to be embraced therein.

For example, in the embodiments described above, the spring 50/absorber 52 is provided on the rear side of the shaft member 80. However, the positional relationship between the spring 50/absorber 52 and the shaft member 80 in the invention is not limited to this. The spring 50/absorber 52 may be provided on the front side of the shaft member 80.

In the embodiments described above, the coupling member 60 (the arms 62, 64) is provided above the axle. However, the positional relationship between the coupling member 60 and the axle in the invention is not limited to this. The coupling member 60 may be provided below the axle.

In the embodiments described above, the central axis X of the shaft member 80 is set to vertically extend, and the pivot axis Y1 of the arm 62 tilts with respect to the pivot axis Y2 of the arm 62, which horizontally extends. However, the positional relationship between the pivot axes Y1 and Y2 in the invention is not limited to this. For example, the central axis X of the shaft member 80 may be set to vertically extend, and the pivot axis Y2 of the arm 62 may tilt with respect to the pivot axis Y1 of the arm 62, which horizontally extend. Alternatively, both the pivot axis Y1 of the arm 62 and the pivot axis Y2 of the arm 64 may slightly tilt with respect to the horizontal surface. In this case, the sum of the tilt angles of the arms 62, 64 with respect to the horizontal surface may be set to a value greater than zero degree and less than five degrees ($0<\theta<5$).

In the embodiments described above, the rotational axis of the carrier 70 (namely, the king pin axis) is set to vertically extend. However, the direction in which the rotational axis of the carrier 70 in the invention is not limited to this. For example, the rotational axis of the carrier 70 may tilt with respect to the vertical center line of the vehicle such that the distance between the rotational axis of the carrier 70 and the vertical center line decreases upward and toward the inside of the vehicle, when viewed from the rear of the vehicle.

In the embodiments described above, the axis along which the tire/wheel assembly-side member slides, namely, the central axis X of the shaft member 80 is set to vertically extend. However, the direction in which the tire/wheel assembly-side member slides in the invention is not limited to this. For example, the shaft along which the tire/wheel assembly-side member slides may tilt with respect to the vertical center line of the vehicle such that the distance between the shaft and the vertical center line decreases upward and toward the inside of the vehicle, when viewed from the rear of the vehicle. In this case, the pivot axis Y1 of the arm 62 and the pivot axis Y2 of the arm 64 tilt in accordance with the tilt of the shaft along which the tire/wheel assembly-side member slides, while the pivot axis Y1 and the pivot axis Y2 are non-parallel with each other.

The invention claimed is:

1. An in-wheel suspension comprising:
a tire/wheel assembly-side member that includes a tire/wheel assembly support member fixed to a tire/wheel assembly;
a vehicle body side member that supports the tire/wheel assembly support member such that the tire/wheel assembly support member can slide along a rotational axis extending in a substantially vertical direction and rotate on the rotational axis;
at least one of a spring element and an attenuation element that acts in accordance with sliding of the tire/wheel assembly support member; and
a coupling member that couples the tire/wheel assembly-side member with the vehicle body-side member, and that rotates the tire/wheel assembly support member in accordance with the sliding of the tire/wheel assembly support member.

2. The in-wheel suspension according to claim 1, wherein the coupling member comprises:
a first arm that is pivotably supported by the vehicle body-side member;
a second arm that is pivotably supported by the tire/wheel assembly-side member; and
a coupling portion that couples the first arm with the second arm such that the first arm and the second arm can rotate with respect to each other, wherein
a pivot axis of the first arm and a pivot axis of the second arm are non-parallel with each other.

3. The in-wheel suspension according to claim 2, wherein,
the pivot axis of the first arm is set so as to be perpendicular to the rotational axis, and
the pivot axis of the second arm is set so as to tilt with respect to the pivot axis of the first arm such that a distance between the pivot axis of the first arm and the pivot axis of the second arm increases upward and toward a front of the vehicle.

4. The in-wheel suspension according to claim 2, wherein,
the pivot axis of the first arm is set so as to be perpendicular to the rotational axis, and
the pivot axis of the second arm is set so as to tilt with respect to the pivot axis of the first arm such that a distance between the pivot axis of the first arm and the pivot axis of the second arm increases upward and toward an inside of the vehicle.

5. The in-wheel suspension according to claim 1, wherein a toe-angle adjustment mechanism is provided to the coupling member.

6. The in-wheel suspension according to claim 5, wherein the toe-angle adjustment mechanism is driven by an actuator.

7. The in-wheel suspension according to claim 5, wherein the toe-angle adjustment mechanism includes a ball joint and an eccentric cam, and
the ball joint and the eccentric cam are arranged such that a central axis of the ball joint and a rotational axis of the eccentric cam are non-coaxial.

8. The in-wheel suspension according to claim 6, wherein the toe-angle adjustment mechanism is includes a ball joint and an eccentric cam, and
the ball joint and the eccentric cam are arranged such that a central axis of the ball joint and a rotational axis of the eccentric cam are non-coaxial.

9. The in-wheel suspension according to claim 1, wherein the spring element and the attenuation element are coaxially arranged, and
an axis of the spring element and the attenuation element, and the rotational axis of the tire/wheel assembly support member, are non-parallel and noncoplanar.

10. The in-wheel suspension according to claim 9, wherein the axis of the spring element and the attenuation element is set to tilt with respect to the rotational axis of the tire/wheel assembly support member such that a distance between the axis of the spring element and the attenuation element and the rotational axis of the tire/wheel assembly support member increases upward and toward a rear of the vehicle, and
the axis of the spring element and the attenuation element is set so as to be outboard of the rotational axis of the tire/wheel assembly support member.

11. An in-wheel suspension comprising:
a tire/wheel assembly-side member that includes a tire/wheel assembly support member fixed to a tire/wheel assembly;
a rotation support member that supports the tire/wheel assembly support member such that the tire/wheel assembly support member can rotate on a rotational axis extending in a substantially vertical direction;
a vehicle body-side member that supports the rotation support member such that the rotation support member can slide along a sliding axis extending in the substantially vertical direction but cannot rotate on the sliding axis;
at least one of a spring element and an attenuation element that acts in accordance with sliding of the rotation support member; and
a coupling member that couples the tire/wheel assembly support member with the vehicle body-side member, and that rotates the tire/wheel assembly support member on the rotational axis in accordance with the sliding of the rotation support member.

12. The in-wheel suspension according to claim 11, wherein the coupling member comprises:
a first arm that is pivotably supported by the vehicle body-side member;
a second arm that is pivotably supported by the tire/wheel assembly-side member; and a coupling portion that couples the first arm with the second arm such that the first arm and the second arm can rotate with respect to each other, wherein
a pivot axis of the first arm and a pivot axis of the second arm are non-parallel with each other.

13. The in-wheel suspension according to claim 12, wherein,
the pivot axis of the first arm is set so as to be perpendicular to the rotational axis, and
the pivot axis of the second arm is set so as to tilt with respect to the pivot axis of the first arm such that a distance between the pivot axis of the first arm and the pivot axis of the second arm increases upward and toward a front of the vehicle.

14. The in-wheel suspension according to claim 12, wherein,
the pivot axis of the first arm is set so as to be perpendicular to the rotational axis, and
the pivot axis of the second arm is set so as to tilt with respect to the pivot axis of the first arm such that a distance between the pivot axis of the first arm and the pivot axis of the second arm increases upward and toward an inside of the vehicle.

15. The in-wheel suspension according to claim 11, wherein
a toe-angle adjustment mechanism is provided to the coupling member.

16. The in-wheel suspension according to claim 15, wherein
the toe-angle adjustment mechanism is driven by an actuator.

17. The in-wheel suspension according to claim 15, wherein
the toe-angle adjustment mechanism includes a ball joint and an eccentric cam, and
the ball joint and the eccentric cam are arranged such that a central axis of the ball joint and a rotational axis of the eccentric cam are non-coaxial.

18. The in-wheel suspension according to claim 16, wherein
the toe-angle adjustment mechanism includes a ball joint and an eccentric cam, and
the ball joint and the eccentric cam are arranged such that a central axis of the ball joint and a rotational axis of the eccentric cam are non-coaxial 19. The in-wheel suspension according to claim 11, wherein
the spring element and the attenuation element are coaxially arranged, and
an axis of the spring element and the attenuation element, and the rotational axis of the tire/wheel assembly support member, are non-parallel and noncoplanar.

20. The in-wheel suspension according to claim 19, wherein
the axis of the spring element and the attenuation element is set to tilt with respect to the rotational axis of the tire/wheel assembly support member such that a distance between the axis of the spring element and the attenuation element and the rotational axis of the tire/wheel assembly support member increases upward and toward a rear of the vehicle, and
the axis of the spring element and the attenuation element is set so as to be outboard of the rotational axis of the tire/wheel assembly support member.

21. An in-wheel suspension comprising:
a rotation support mechanism that supports a tire/wheel assembly via a rotation member such that the tire/wheel assembly can rotate in a direction in which a steering wheel is operated;
a sliding support mechanism that supports the tire/wheel assembly via a sliding member such that the tire/wheel assembly can slide in a substantially vertical direction with respect to a vehicle body;

at least one of a spring element and an attenuation element that acts in accordance with sliding of the sliding member; and
a coupling member that couples the rotation support mechanism with the sliding support mechanism, that restricts rotation of the rotation member, and that rotates the rotation member in accordance with the sliding of the sliding member.

* * * * *